United States Patent
Hsu et al.

(10) Patent No.: US 10,063,470 B2
(45) Date of Patent: Aug. 28, 2018

(54) DATA CENTER NETWORK SYSTEM BASED ON SOFTWARE-DEFINED NETWORK AND PACKET FORWARDING METHOD, ADDRESS RESOLUTION METHOD, ROUTING CONTROLLER THEREOF

(71) Applicant: Industrial Technology Research Institute, Hsinchu (TW)

(72) Inventors: Ming-Hung Hsu, Taoyuan (TW); Shi-Wei Lee, Chiayi County (TW); Kuang-Yi Li, Taipei (TW); Jong-Harn Ywi-Chi, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 318 days.

(21) Appl. No.: 14/957,612

(22) Filed: Dec. 3, 2015

(65) Prior Publication Data

US 2016/0337236 A1    Nov. 17, 2016

Related U.S. Application Data

(60) Provisional application No. 62/159,965, filed on May 12, 2015.

(30) Foreign Application Priority Data

May 29, 2015   (TW) .............................. 104117469 A

(51) Int. Cl.
*H04L 12/715* (2013.01)
*H04L 29/12* (2006.01)

(52) U.S. Cl.
CPC ........ *H04L 45/64* (2013.01); *H04L 29/12028* (2013.01); *H04L 61/103* (2013.01)

(58) Field of Classification Search
CPC .. H04L 45/64; H04L 29/12028; H04L 61/103
See application file for complete search history.

(56) References Cited

U.S. PATENT DOCUMENTS 8,369,333 B2 *  2/2013  Hao .................... H04L 12/4633
                                                    370/392
8,861,359 B2    10/2014 Sugita et al.
(Continued)

FOREIGN PATENT DOCUMENTS

CN    103081418    5/2013
CN    104301446    1/2015
(Continued)

OTHER PUBLICATIONS

Nunes et al , "Virtualized Network Isolation Using Software Defined Networks", IEEE, 2013.*
(Continued)

*Primary Examiner* — Habte Mered
(74) *Attorney, Agent, or Firm* — JCIPRNET

(57) ABSTRACT

A data center network system based on software-defined network (SDN) is provided. The data center network system includes a plurality of physical machines, a plurality of Ethernet switches, a plurality of OpenFlow switches connected to each other, and a central control apparatus. Each of the physical machines includes a virtual switch and at least one virtual machine. The virtual switches modify destination media access control (MAC) addresses of packets to MAC addresses of the OpenFlow switches, such that the Ethernet switches forward the packets received from the virtual switches to the corresponding OpenFlow switches according to the MAC addresses of the OpenFlow switches. The OpenFlow switches modify the destination media access control (MAC) addresses of the packets to MAC addresses of virtual machines, such that the Ethernet switches forward (Continued)

the packet received from the OpenFlow switches to the corresponding virtual switches.

29 Claims, 9 Drawing Sheets

(56) References Cited

U.S. PATENT DOCUMENTS

| | | | |
|---|---|---|---|
| 9,106,445 B2* | 8/2015 | McDysan | H04L 12/4641 |
| 9,432,287 B2* | 8/2016 | Benny | H04L 45/64 |
| 2011/0299537 A1* | 12/2011 | Saraiya | H04L 61/2596 |
| | | | 370/392 |
| 2013/0103817 A1 | 4/2013 | Koponen et al. | |
| 2013/0103818 A1 | 4/2013 | Koponen et al. | |
| 2013/0114466 A1 | 5/2013 | Koponen et al. | |
| 2013/0148666 A1 | 6/2013 | Shimonishi et al. | |
| 2013/0208623 A1 | 8/2013 | Koponen et al. | |
| 2013/0211549 A1 | 8/2013 | Thakkar et al. | |
| 2013/0212148 A1 | 8/2013 | Koponen et al. | |
| 2013/0212235 A1 | 8/2013 | Fulton et al. | |
| 2013/0212243 A1 | 8/2013 | Thakkar et al. | |
| 2013/0212244 A1 | 8/2013 | Koponen et al. | |
| 2013/0212245 A1 | 8/2013 | Koponen et al. | |
| 2013/0212246 A1 | 8/2013 | Koponen et al. | |
| 2013/0219037 A1 | 8/2013 | Thakkar et al. | |
| 2013/0219078 A1 | 8/2013 | Padmanabhan et al. | |
| 2014/0119375 A1* | 5/2014 | Tseng | H04L 49/70 |
| | | | 370/392 |
| 2014/0146817 A1* | 5/2014 | Zhang | H04L 45/74 |
| | | | 370/392 |
| 2014/0195695 A1 | 7/2014 | Okita | |
| 2014/0201738 A1 | 7/2014 | Choi et al. | |
| 2014/0365622 A1 | 12/2014 | Iyengar et al. | |
| 2015/0043588 A1 | 2/2015 | Kato | |
| 2015/0124812 A1* | 5/2015 | Agarwal | H04L 45/24 |
| | | | 370/392 |
| 2015/0326524 A1* | 11/2015 | Tankala | H04L 61/103 |
| | | | 709/245 |
| 2016/0014241 A1* | 1/2016 | Tai | H04L 12/4633 |
| | | | 370/474 |
| 2016/0191421 A1* | 6/2016 | Tsuji | H04L 12/6418 |
| | | | 370/392 |
| 2016/0241467 A1* | 8/2016 | Gunasekaran | H04L 45/42 |
| 2016/0315866 A1* | 10/2016 | Thapar | H04L 47/2408 |
| 2017/0118171 A1* | 4/2017 | Wu | H04L 61/2592 |

FOREIGN PATENT DOCUMENTS

| | | |
|---|---|---|
| TW | 201225586 | 6/2012 |
| WO | 2013043604 | 3/2013 |
| WO | 2014136864 | 9/2014 |
| WO | 2015025845 | 2/2015 |

OTHER PUBLICATIONS

Mysore et al., "PortLand: A Scalable Fault-Tolerant Layer 2 Data Center Network Fabric," Proceedings of the ACM SIGCOMM 2009 conference on Data communication, Aug. 2009, pp. 39-50.

Benson et al., "CloudNaaS: A Cloud Networking Platform for Enterprise Applications," Proceedings of the 2nd ACM Symposium on Cloud Computing, Oct. 2011, pp. 1-13.

Guo et al., "SecondNet: A Data Center Network Virtualization Architecture with Bandwidth Guarantees," Proceedings of the 6th International COnference, Dec. 2010, pp. 1-14.

Mudigonda et al., "SPAIN: COTS Data-Center Ethernet for Multipathing over Arbitrary Topologies," NSDI'10 Proceedings of the 7th USENIX conference on Networked systems design and implementation, Apr. 2010, pp. 1-16.

Chiueh et al., "Peregrine: An All-Layer-2 Container Computer Network," 2012 IEEE Fifth International Conference on Cloud Computing, Jun. 2012, pp. 686-693.

Greenberg et al., "VL2: A Scalable and Flexible Data Center Network," Proceedings of the ACM SIGCOMM 2009 conference on Data communication, Aug. 2009, pp. 51-62.

* cited by examiner

DATA CENTER NETWORK SYSTEM BASED ON SOFTWARE-DEFINED NETWORK AND PACKET FORWARDING METHOD, ADDRESS RESOLUTION METHOD, ROUTING CONTROLLER THEREOF

CROSS-REFERENCE TO RELATED APPLICATION

This application claims the priority benefits of U.S. provisional application Ser. No. 62/159,965, filed on May 12, 2015 and Taiwan application serial no. 104117469, filed on May 29, 2015. The entirety of each of the above-mentioned patent applications is hereby incorporated by reference herein and made a part of this specification.

TECHNICAL FIELD

The disclosure relates to a data center network system based on a software-defined network and a packet forwarding method, an address resolution method, and a routing controller thereof.

BACKGROUND

With the prosperous development of computer technology and the Internet, the use of cloud computing is becoming more and more popular. Due to the trend of cloud computing, data centers play a role more important than ever. Modern large-scale data center may include hundreds of thousands of physical machines, such as servers. Each of the physical machines may contain a plurality of virtual machines operating thereon. The tenants of the large-scale data center may rent the virtual machines to use cloud resource which is supplied by the large-scale data center for computing, retrieving, and storing data. It is generally considered that the network of the "large-scale data center" has the following features, including: (1) able to provide more than one hundred of thousands of physical machines and one million virtual machines; (2) able to allow the tenants to assign the private IP addresses of the virtual machines by themselves, so that the virtual machines of different tenants may designate repeated IP addresses; (3) able to promptly recover from malfunctioning; having the function of plug-and-plug (e.g., the network system may automatically set up the network settings of the network devices); (4) allowing flexible migration of virtual machines; (5) allowing the use of multiple tenants, wherein the tenants may set the VLAN by themselves; (6) having the ability of routing to dynamically balance the network loads; (7) able to detect the network topology and detect the virtual machines and the physical machines; and (8) capable of resolving network addresses and learning the addresses of media access control (MAC).

As the size of the large-scale data centers increases, the conventional network framework and technology can no longer satisfy the needs of the large-scale data centers. For a data center network framework based on a layer-3 (L3) network, there is a management issue of low flexibility and high complexity. For example, the assignment of IP addresses is limited by the framework of physical addresses and is rather inflexible in migration of virtual machines. Thus, recently, the configuration and operation of the conventional data center network have been developed based on the Ethernet switches of the layer-2 (L2) network.

However, for the framework of data center based on the L2 network, the issue of being difficult to enlarge the scale may arise. The framework of data center based on the L-2 network has difficulties in enlarging its scale for the following reasons. First, even though the spanning tree protocol (STP) may avoid the loop in the L2 network, multiple-path transmission (e.g., equal cost multi-path, ECMP) cannot be used. Also, the form size of the forwarding information base (FIB) of the Ethernet switches is limited, making the Ethernet switches frequently broadcast to look for the MAC address of the destination terminal of the packet. Besides, the Ethernet is not compatible with dynamic changes of routing and does not provide services guaranteeing the quality of service (QoS). In addition, the convergence time from malfunctioning for the Ethernet is too long. Lastly, the current IEEE 802.1Q standard can only provide 4096 virtual local area networks, and thus fails to meet the requirement on the number of tenants of the large-scale data center. Accordingly, how to design a data center network system that meets the requirements of the large-scale data centers is an issue that people having ordinary skills in the art should work on.

SUMMARY

The disclosure provides a data center network system based on a software-defined network. The data center network system includes a plurality of physical machines, a plurality of Ethernet switches, a plurality of OpenFlow switches connected to each other, and a central control device. Each of the physical machines includes a virtual switch and at least one virtual machine, and the Ethernet switches are connected to the physical machines. The virtual switch corresponds to the virtual machine which is in the same physical machine as the virtual switch. A part or all the OpenFlow switches are connected to the Ethernet switches. The central control device is connected to the OpenFlow switches, and sets up a plurality of flow entries in the virtual switches of the physical machines and the OpenFlow switches, so as to set up a routing path for forwarding a packet between the virtual machines. One of the virtual switches modifies a destination MAC address of the packet into a MAC address of one of the OpenFlow switches according to the flow entries, such that one of the Ethernet switches forwards the packet received from the one of the virtual switches to the corresponding OpenFlow switch according to the MAC address of the one of the OpenFlow switch. Another one of the OpenFlow switches modifies the destination MAC address of the packet into a MAC address of one of the virtual machines according to the flow entries, such that another one of the Ethernet switches forwards the packet received from the another one of OpenFlow switch to the corresponding virtual switch according to the MAC address of the one of the virtual machines.

The disclosure provides a packet forwarding method for a data center network system based on a software-defined network. The data center network system includes a plurality of physical machines, a plurality of Ethernet switches connected to the physical machines, a plurality of OpenFlow switches connected to each other and to the Ethernet switches, and a central control device connected to the OpenFlow switches. The physical machines respectively include a virtual switch and at least one virtual machine. The method includes steps as follows. The central control device sets a plurality of flow entries in the virtual switches of the physical machines and the OpenFlow switches, so as to set up a routing path for forwarding a packet between the virtual machines. One of the virtual switch modifies a destination MAC address of the packet into a MAC address of one of the OpenFlow switches according to the flow entries, such that one of the Ethernet switches forwards the packet received from the one of the virtual switches to an ingress switch among the OpenFlow switches according to the MAC address of the one of the OpenFlow switches. An egress switch among the OpenFlow switches modifies the destination MAC address of the packet into a MAC address of one of the virtual machines according to the flow entries, such that another one of the Ethernet switches forwards the packet received from the egress switch to the corresponding virtual switch according to the MAC address of the one of the virtual machines.

The disclosure provides an address resolution method suitable for a data center network system based on a software-defined network. The data center network system includes a plurality of physical machines, a plurality of Ethernet switches connected to the physical machines, a plurality of OpenFlow switches connected to each other and to the Ethernet switches, and a central control device connected to the OpenFlow switches. The physical machines respectively include a virtual switch and at least one virtual machine. The method includes steps as follows. A first virtual machine among the virtual machines sends an address resolution protocol (ARP) request to look up a MAC address of a second virtual machine among the virtual machines. One of the virtual switches or one of the OpenFlow switches intercepts the ARP request sent by the first virtual machine, encapsulates the ARP request, and directly sends the encapsulated ARP request to the central control device. In response to receiving the ARP request, the central control device looks up the MAC address of the second virtual machine in a database, so as to generate an ARP reply packet according to the MAC address of the second virtual machine. The central control device sends the ARP reply packet to the first virtual machine, such that the first virtual machine obtains the MAC address of the second virtual machine.

The disclosure provides a routing controller for a data center network system based on a software-defined network. The data center network system includes a plurality of physical machines connected to an aggregation layer network, the aggregation layer network includes a plurality of Ethernet switches, and the physical machines respectively include at least one virtual machine and a virtual switch. The routing controller includes a network unit, a processor, and a storage unit. The network unit is connected to a core layer network. In addition, the core layer network includes a plurality of OpenFlow switches connected to each other and to the aggregation layer network. The processor is coupled to the network unit. The storage unit is coupled to the processor and stores a plurality of commands. Also, the processor executes the commands to: decide a routing path for forwarding a packet between a first virtual machine among the virtual machines and a second virtual machine among the virtual machines, and send commands to the virtual switches on the routing path, so as to control one of the virtual switches to write a first flow entry to a flow table of the one of the virtual switches. An operation of the first flow entry includes: modifying a destination MAC address of the packet into a MAC address of one of the OpenFlow switches. Furthermore, the processor executes the commands to send a command to another one of the OpenFlow switches on the routing path, so as to control the another one of OpenFlow switches to write a second flow entry to a flow table of the another one of OpenFlow switches. An operation of the second flow entry includes: modifying the destination MAC address of the packet into a MAC address of the second virtual machine.

Based on above, the disclosure provides the data center network system based on a software-defined network (SDN), the packet forwarding method, the address resolution method, and the routing controller thereof. The disclosure builds a network framework meets the requirements of a large-scale data center by using the Ethernet switches and the OpenFlow switches at the same time.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate embodiments and, together with the description, serve to explain the principles of the disclosure.

DETAILED DESCRIPTION OF DISCLOSED EMBODIMENTS

Figure 1:
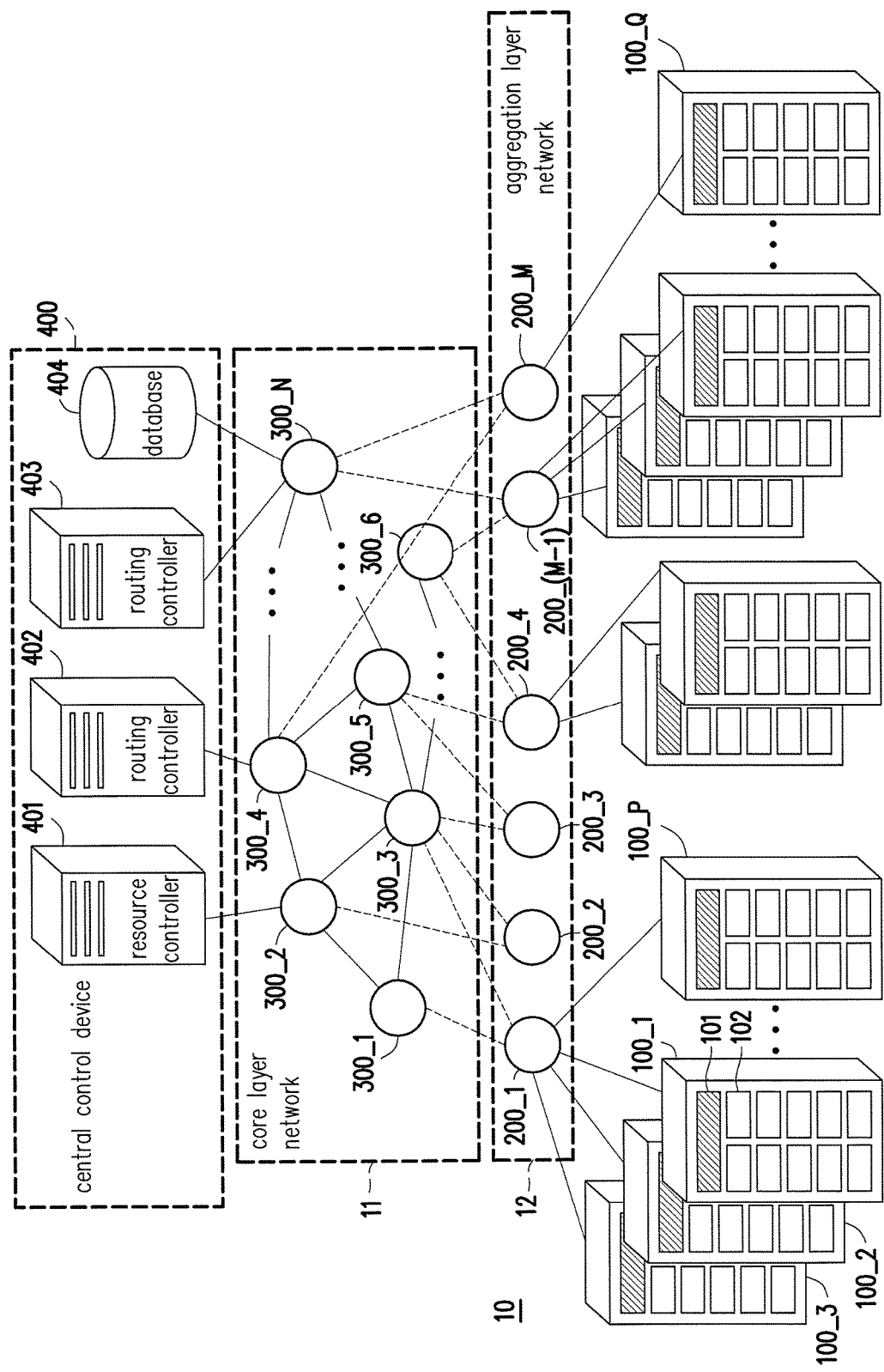
FIG. 1 is a schematic view illustrating a data center network system according to an embodiment of the disclosure.

FIG. 1 is a schematic view illustrating a data center network system according to an embodiment of the disclosure. Referring to FIG. 1, a data center network system 10 includes a plurality of physical machines 100_1 to 100_Q (Q is a positive integer), a plurality of Ethernet switches 200_1 to 200_M (M is a positive integer), a plurality of OpenFlow switches 300_1 to 300_N (N is a positive integer) connected to each other, and a central control device 400. In brief, the data center network system 10 may be considered as a cloud computing and storing center. At least one tenant may use hardware and software resources of the data center network system 10 through a network. In this embodiment, each of the physical machines 100_1 to 100Q may operate ten virtual machines. However, the disclosure is not limited thereto. In other embodiments, each of the physical machines 100_1 to 100_Q may operate more or less than ten virtual machines, and the number of the virtual machines operated by each of the physical machines 100_1 to 100_Q may be the same as or different from each other. Besides, each of the physical machines 100_1 to 100_Q includes a corresponding virtual switch. In this way, the virtual machines operated by the physical machines 100_1 to 100_Q may be connected to an aggregation layer network 12 through the virtual switches. In addition, the Ethernet switches 200_1 to 200_M are deployed as the aggregation layer network 12. Taking the physical machine 100_1 as an example, the physical machine 100_1 includes a virtual switch 101 and a virtual machine 102, and the virtual machine 102 may be connected to the aggregation layer network 12 through the virtual switch 101. Here, the virtual switches of the physical machines 100_1 to 100_Q are compatible with a basic OpenFlow protocol. In general, the virtual switches may be implemented with an open-source software Open vSwitch.

The Ethernet switches 200_1 to 200_M have a plurality of ports, such that the Ethernet switches 200_1 to 200_M may be connected to the virtual switches of the physical machines 100_1 to 100_Q through the ports thereof. Taking the Ethernet switch 200_1 as an example, the Ethernet switch 200_1 may be connected to the physical machines 100_1 to 100_P through P ports (P is a positive integer). It should be noted that the disclosure does not intend to limit the number of ports of the Ethernet switches 200_1 to 200_M. Thus, the number of physical machines that are connected to each of the Ethernet switches 200_1 to 200_M may be the same as or different from each other.

The OpenFlow switches 300_1 to 300_N are connected to each other and deployed as a core layer network 11. In addition, the OpenFlow switches 300_1 to 300_N also have a plurality of ports. The OpenFlow switches 300_1 to 300_N may be connected to each other through their respective ports. In addition, the OpenFlow switches 300_1 to 300_N and the Ethernet switches 200_1 to 200_M may be connected to each other through the respective ports of the OpenFlow switches 300_1 to 300_N and the Ethernet switches 200_1 to 200_M. In this embodiment, a part of the OpenFlow switches 300_1 to 300_N are connected to the Ethernet switches 200_1 to 200_M.

In this embodiment, the Ethernet switches 200_1 to 200_M are respectively connected to two of the OpenFlow switches 300_1 to 300_N through two ports. For example, the Ethernet switch 200_1 is connected to the OpenFlow switches 300_1 and 300_3 through the ports of the Ethernet switch 200_1. It should be noted that, in another embodiment, the Ethernet switches 200_1 to 200_M may be connected to more OpenFlow switches through more ports. Alternatively, the Ethernet switches 200_1 to 200_M may be connected to one OpenFlow switch through one port. The disclosure does not intend to impose a limitation in this regard. Besides, in another embodiment, based on a different shape of a network topology, all of the OpenFlow switches 300_1 to 300_N may be connected to the Ethernet switches 200_1 to 200M. It can thus be seen that the aggregation layer network 12 is set between the physical machines 100_1 to 100_Q and the core layer network 11. Accordingly, the physical machines 100_1 to 100_P may be connected to the core layer network 11 through the Ethernet switches 200_1 to 200_M.

The central control device 400 is connected to a part of or all the OpenFlow switches 300_1 to 300_N in the core layer network 11, so as to manage all the physical machines 100_1 to 100_Q, the virtual machines, the Ethernet switches 200_1 to 200M, and the OpenFlow switches 300_1 to 300_N connected in the data center network system 10. In this embodiment, the central control device 400 may include a resource controller 401, a routing controller 402, a routing controller 403, and a database 404. Though not shown in FIG. 1, the resource controller 401, the routing controller 402, the routing controller 403, and the database 404 respectively have hardware components, such as processor circuits, memories, network devices (e.g., network cards), and hard disks, etc. In addition, even though a combination of the resource controller 401, the routing controller 402, the routing controller 403, and the database 404 is used in this embodiment to realize the central control device 400, the disclosure is not limited thereto. In another embodiment, the central control device 400 may be realized as a single control device having a processor circuit, a memory, and a network device. In this embodiment, the resource controller 401 is in charge of managing and allocating the hardware/software resources of the whole data center network system 10, and stores management information concerning tenants, the physical machines 100_1 to 100_Q, the virtual machines, the Ethernet switches 200_1 to 200_M, and the OpenFlow switches 300_1 to 300_N in the database 404.

For example, the management information may include tenant identities (tenant IDs) of the tenants, Internet protocol (IP) addresses of the physical machines 100_1 to 100_Q, physical machine identities (PM IDs) of the physical machines 100_1 to 100_Q, media access control (MAC) addresses of the physical machines 100_1 to 100_Q, IP addresses of the virtual machines, virtual machine identities (VM IDs) of the virtual machines, MAC addresses of the virtual machines, switch identities (switch IDs) of the Ethernet switches 200_1 to 200_M and the OpenFlow switches 300_1 to 300N, and MAC addresses of the Ethernet switches 200_1 to 200_M and the OpenFlow switches 300_1 to 300_N. For example, suites required for a cloud computing environment developed by using OpenStack and configuration files of the suites may be installed in the resource controller 401. However, the disclosure is not limited thereto.

The routing controller 402 and the routing controller 403 are in charge of network management and network control, such as deciding on a routing path, handling address resolution, position tracking of the virtual machines, fault handling, or database updating, etc. It should be noted that while the embodiment is described as having the two routing controller 402 and 403 as an example, the disclosure is not limited thereto. In another embodiment, the control device 400 may include one, three, or more routing controllers.

The routing controller 402 and the routing controller 403 may be informed of network settings of the tenants by accessing data in the database 404. In addition, the routing controller 402 and the routing controller 403 may uniformly control a network flow usage and a routing path in the data center network system 10 according to the OpenFlow protocol. More specifically, in this embodiment, the routing controller 402 and the routing controller 403 may decide a routing path of a packet. The routing controller 402 and the routing controller 403 use an OpenFlow protocol message to control the OpenFlow switches 300_1 to 300_N in the core layer network 11 and the virtual switch of each of the physical machines 100_1 to 100_Q. In this way, the OpenFlow switches 300_1 to 300_N and each of the virtual switches of the physical machines 100_1 to 100_Q may write a flow entry into a respective flow table. Accordingly, the OpenFlow switches 300_1 to 300_N and the virtual switch of each of the physical machines 100_1 to 100_Q may decide how the packet should be forwarded by referring to the own flow table. In other words, the central control device 400 sets a plurality of flow entries in the virtual switches of the physical machines 100_1 to 100_Q and the OpenFlow switches 300_1 to 300_N, so as to set up the routing path for forwarding the packet.

It should be noted in particular that, before the virtual switches forwarding the packet sent by the virtual machines to the Ethernet switches 200_1 to 200_M, the virtual switch of each of the physical machines 100_1 to 100_Q may modify a destination MAC address of the packet into one of the MAC addresses of the OpenFlow switches 300_1 to 300_N according to the flow entries. In this way, the Ethernet switches 200_1 to 200_M may forward the packet received from the virtual switches to the corresponding OpenFlow switch, which is one of the OpenFlow switches 300_1 to 300_N designated in the flow entries, according to the MAC address of the OpenFlow switch.

Besides, before the OpenFlow switches 300_1 to 300_N forward the packet to the Ethernet switches 200_1 to 200_M, the OpenFlow switches 300_1 to 300_N may modify the destination MAC address of the packet into the MAC address of the virtual machine according to the flow entries. In this way, the Ethernet switches 200_1 to 200_M may forward the packet received from the OpenFlow switches 300_1 to 300_N to the corresponding virtual switch according to the MAC address of the virtual machine.

Figure 2:
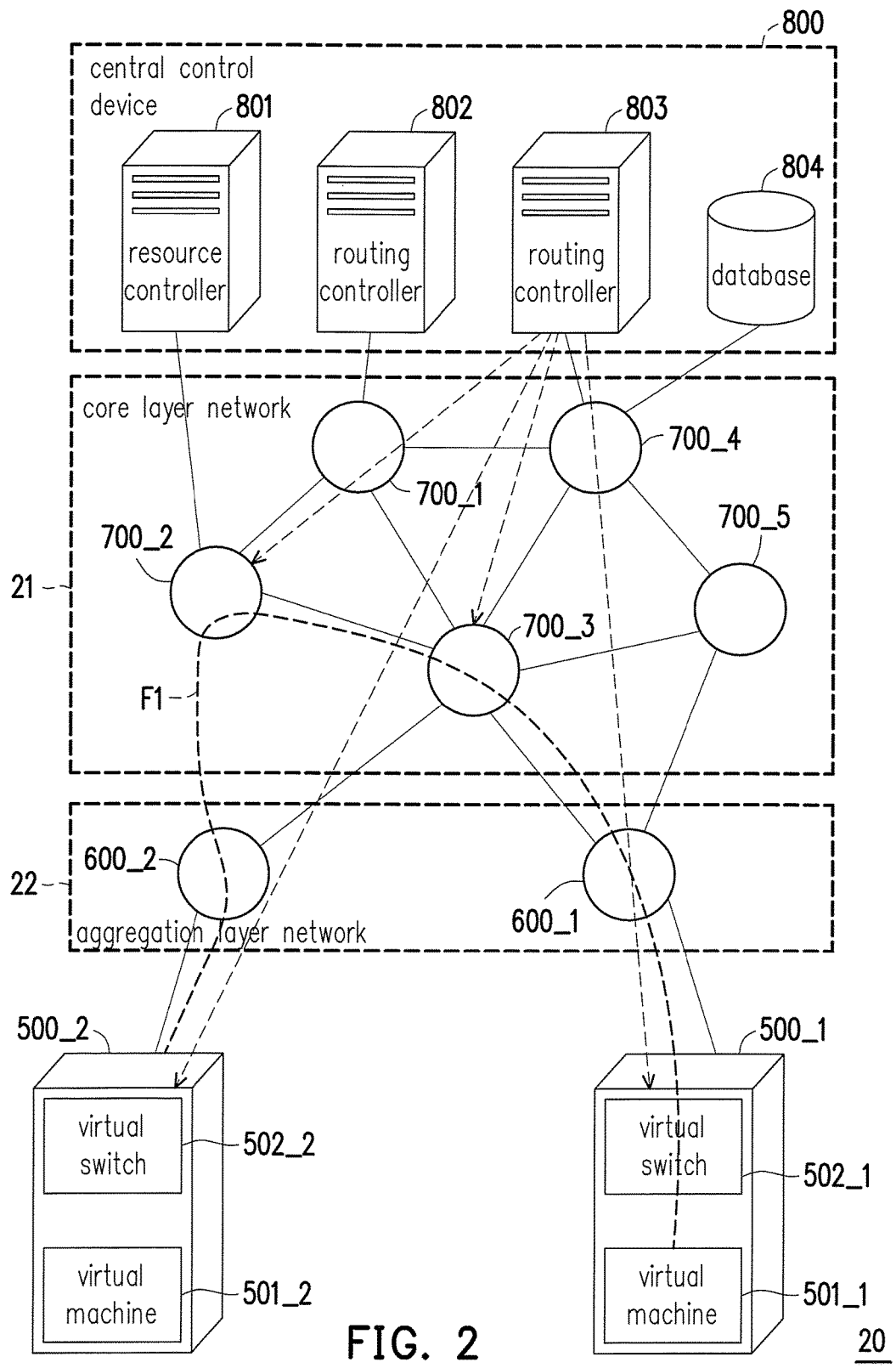
FIG. 2 is a schematic view illustrating setting a routing path according to an embodiment of the disclosure.

To clearly describe the disclosure, an example with two physical machines, two Ethernet switches, and five OpenFlow switches is described in the following. However, the disclosure is not limited thereto. FIG. 2 is a schematic view illustrating setting a routing path according to an embodiment of the disclosure. Referring to FIG. 2, the data center network system 10 includes physical machines 500_1 and 500_2, Ethernet switches 600_1 to 600_2, OpenFlow switches 700_1 to 700_5, and a central control device 800. The physical machine 500_1 is connected to the Ethernet switch 600_1 in an aggregation layer 22, and the physical machine 500_2 is connected to the Ethernet switch 600_2 in the aggregation layer 22. The physical machine 500_1 includes a virtual machine 501_1 and a virtual switch 502_1, and the physical machine 500_2 includes a virtual machine 501_2 and a virtual switch 502_2.

The Ethernet switch 600_1 is connected to the OpenFlow switches 700_3 and 700_5 in a core layer network 22, and the Ethernet switch 600_2 is connected to the OpenFlow switches 700_2 and 700_3 in the core layer network 22. The OpenFlow switches 700_1 to 700_5 are connected to each other according to a topology structure shown in FIG. 2. The central control device 800 includes a resource controller 801, a routing controller 802, a routing controller 803, and a database 804. The resource controller 801 is connected to the OpenFlow switch 700_2, the routing controller 802 is connected to the OpenFlow switch 700_1, and the routing controller 803 and the database 804 are connected to the OpenFlow switch 700_4.

Under a network framework shown in FIG. 2, the routing controller 803 decides a routing path F1 between the virtual machine 501_1 and 501_2 for forwarding a packet. In this embodiment, the routing controller 803 may use a FlowMod message to set flow entries in the virtual switch 502_1, the OpenFlow switch 700_3, the OpenFlow switch 700_2, and the virtual switch 502_2, so as to set up the routing path F1 between the virtual machine 501_1 and the virtual machine 501_2 for forwarding the packet. The routing path F1 includes the virtual switch 502_1, the Ethernet switch 600_1, the OpenFlow switch 700_3, the OpenFlow switch 700_2, the Ethernet switch 600_2, and the virtual switch 502_2. In this embodiment, if the virtual machine 501_1 is a packet sending terminal, then the virtual switch 502_1 is a source virtual switch, the OpenFlow switch 700_3 is an ingress switch of the core layer network 21, the OpenFlow switch 700_2 is an egress switch of the core layer network 21, and the virtual switch 502_2 is a destination virtual switch. On the contrary, if the virtual machine 501_2 is the packet sending terminal, then the virtual switch 502_2 is the source virtual switch, the OpenFlow switch 700_2 is the ingress switch of the core layer network 21, the OpenFlow switch 700_3 is the egress switch of the core layer network 21, and the virtual switch 502_1 is the destination virtual switch. In this way, the virtual machine 501_1 and the virtual machine 501_2 may send packets to each other through the routing path F1.

Each of the virtual switch 502_1, the virtual switch 502_2, and the OpenFlow switches 700_1 to 700_5 stores a flow table. Flow entries recorded in the flow tables include matching conditions and operations. In a process of forwarding the packet, the virtual switch 502_1, the OpenFlow switch 700_3, the OpenFlow switch 700_2, and the virtual switch 502_2 on the routing path F1 check whether contents in the received packet meets the matching condition in the flow entries. If the matching condition is met, the virtual switch 502_1, the OpenFlow switch 700_3, and the OpenFlow switch 700_2 may perform an operation corresponding to the matching condition that is met. In this way, the packet sent by the virtual machine 501_1 may be successfully forwarded to the virtual machine 501_2 through the virtual switch 502_1, the OpenFlow switch 700_3, the OpenFlow switch 700_2, and the virtual switch 502_2.

Figure 3:
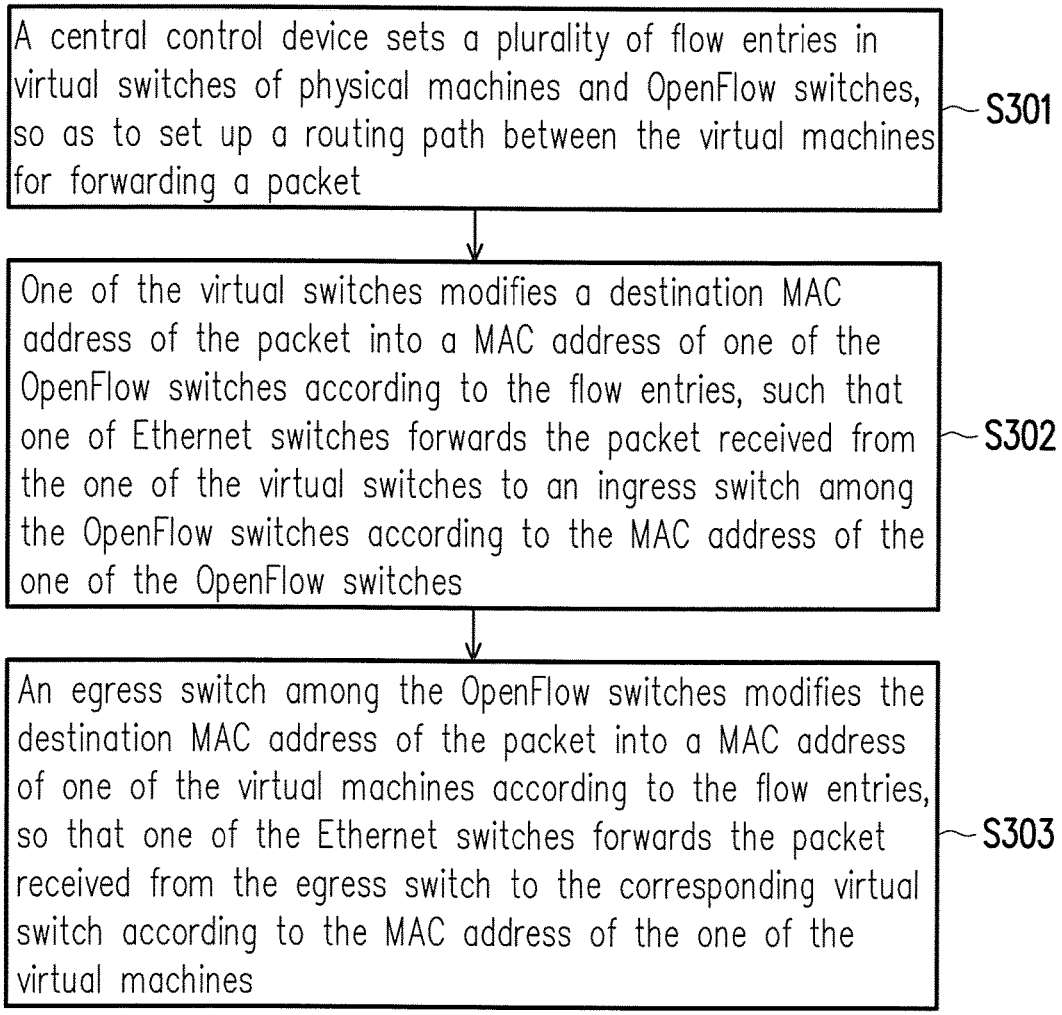
FIG. 3 is a flowchart illustrating a packet forwarding method according to an embodiment of the disclosure.

FIG. 3 is a flowchart illustrating a packet forwarding method according to an embodiment of the disclosure. The packet forwarding method shown in FIG. 3 is suitable for the data center network system 20 of FIG. 2. In the following, the devices shown in FIG. 2 are used to describe detailed steps of this embodiment. However, the disclosure is not limited thereto. Referring to FIG. 2 and FIG. 3 together, at Step S301, the central control device 800 sets a plurality of flow entries in the virtual switches 502_1 and 502_2 of the physical machines 500_1 and 500_2 and the OpenFlow switches 700_2 and 700_3, so as to set up the routing path F1 between the virtual machines 501_1 and 501_2 for forwarding the packet. At Step S302, the virtual switch 502_1 modifies the destination MAC address of the packet into the MAC address of the OpenFlow switch 700_3 according to the flow entries. In this way, the Ethernet switch 600_1 forwards the packet received from the virtual switch 502_1 to the ingress switch (i.e., the OpenFlow switch 700_3) of the OpenFlow switches 700_1 to 700_5 according to the MAC address of the OpenFlow switch 700_3. At Step S303, the egress switch (i.e., the OpenFlow switch 700_2) of the OpenFlow switches 700_1 to 700_5 modifies the destination MAC address of the packet into the MAC address of the virtual machine 501_2 according to the flow entries, so that the Ethernet switch 600_2 forwards the packet received from the egress switch (i.e., the OpenFlow switch 700_2) to the corresponding virtual switch 502_2 according to the MAC address of the virtual machine 501_2.

Figure 4:
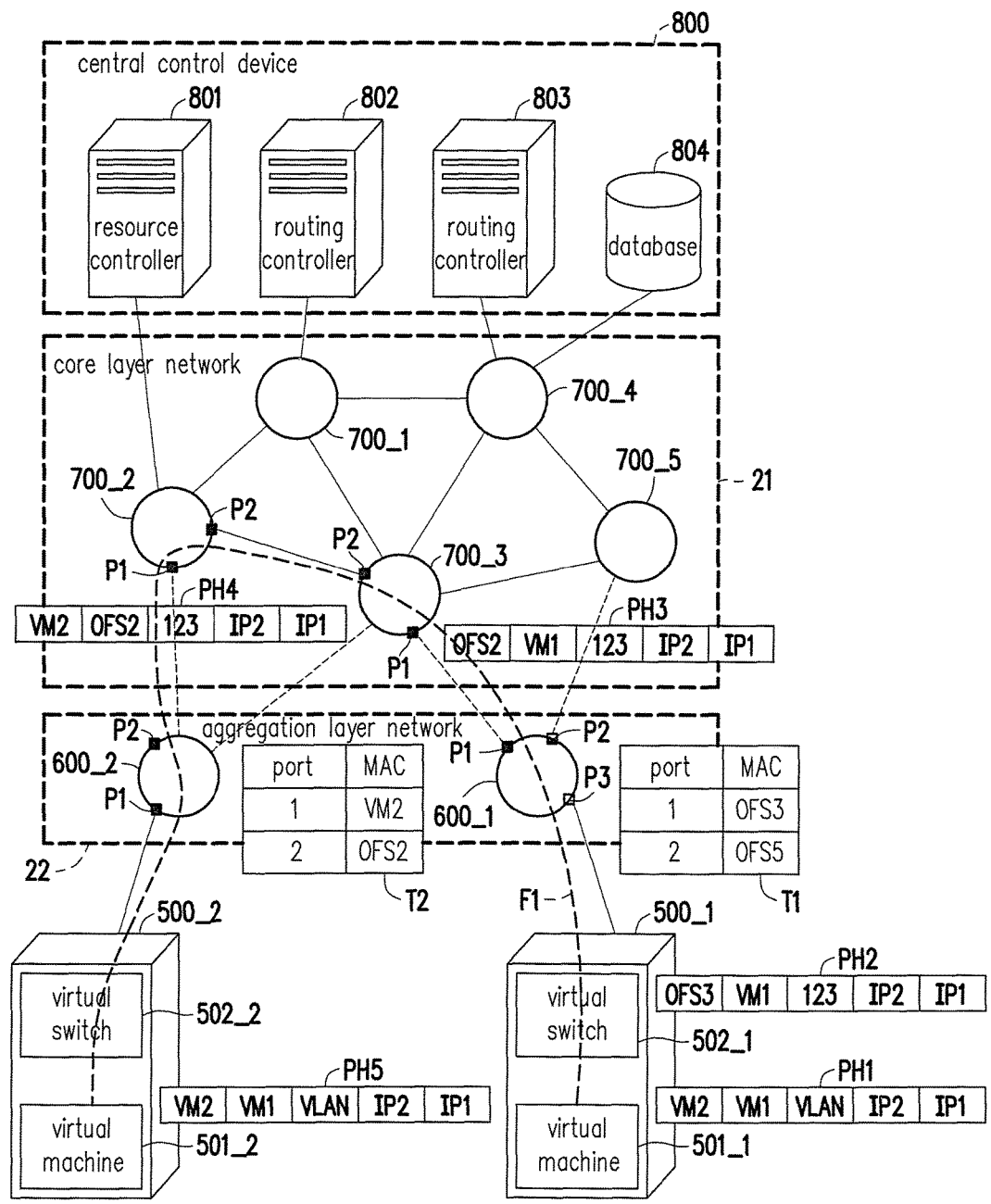
FIG. 4 is a schematic view illustrating a packet forwarding method according to an embodiment of the disclosure.
Figure 5A:
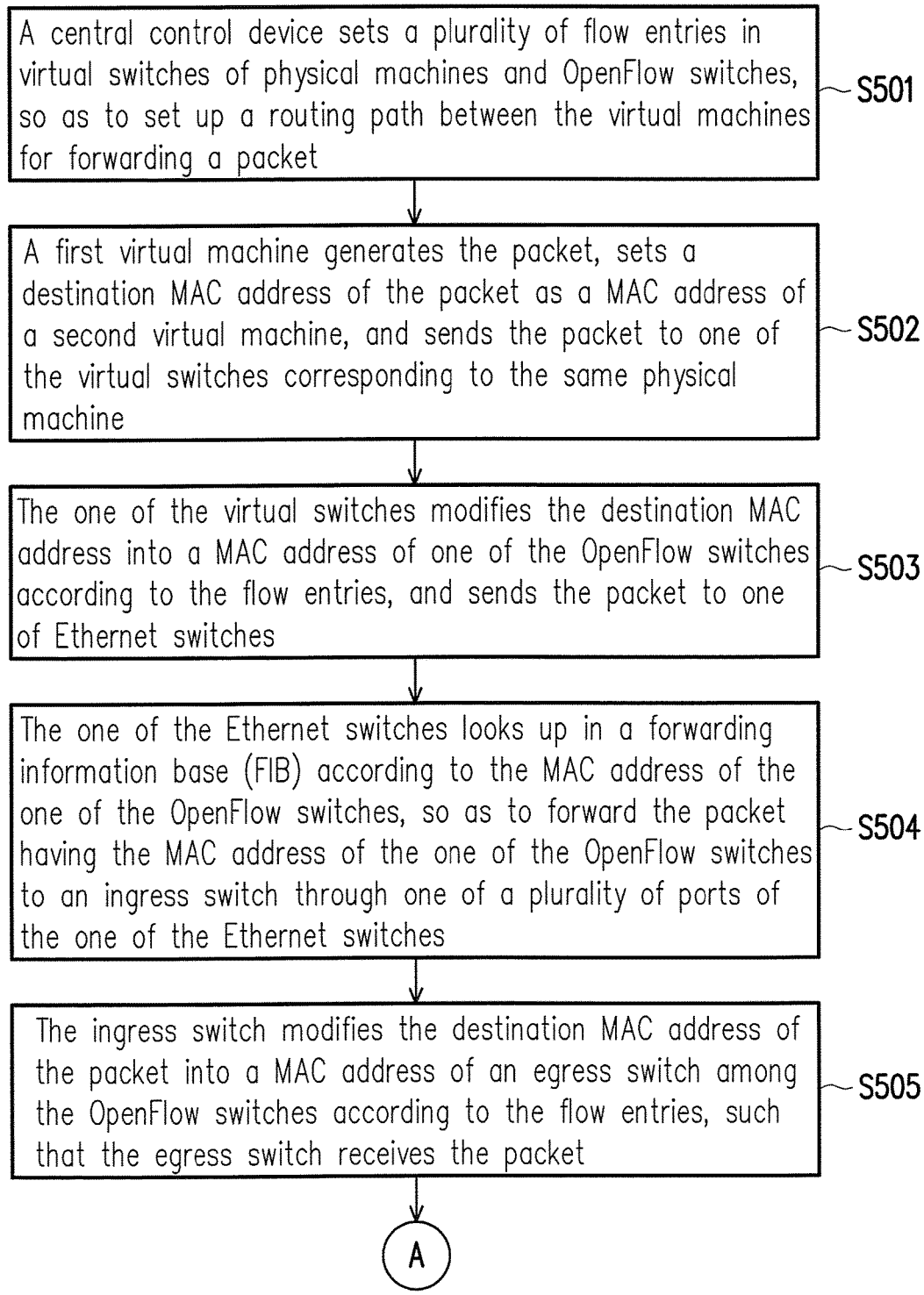
FIGS. 5A and 5B are flowcharts illustrating a packet forwarding method according to an embodiment of the disclosure.
Figure 5B:
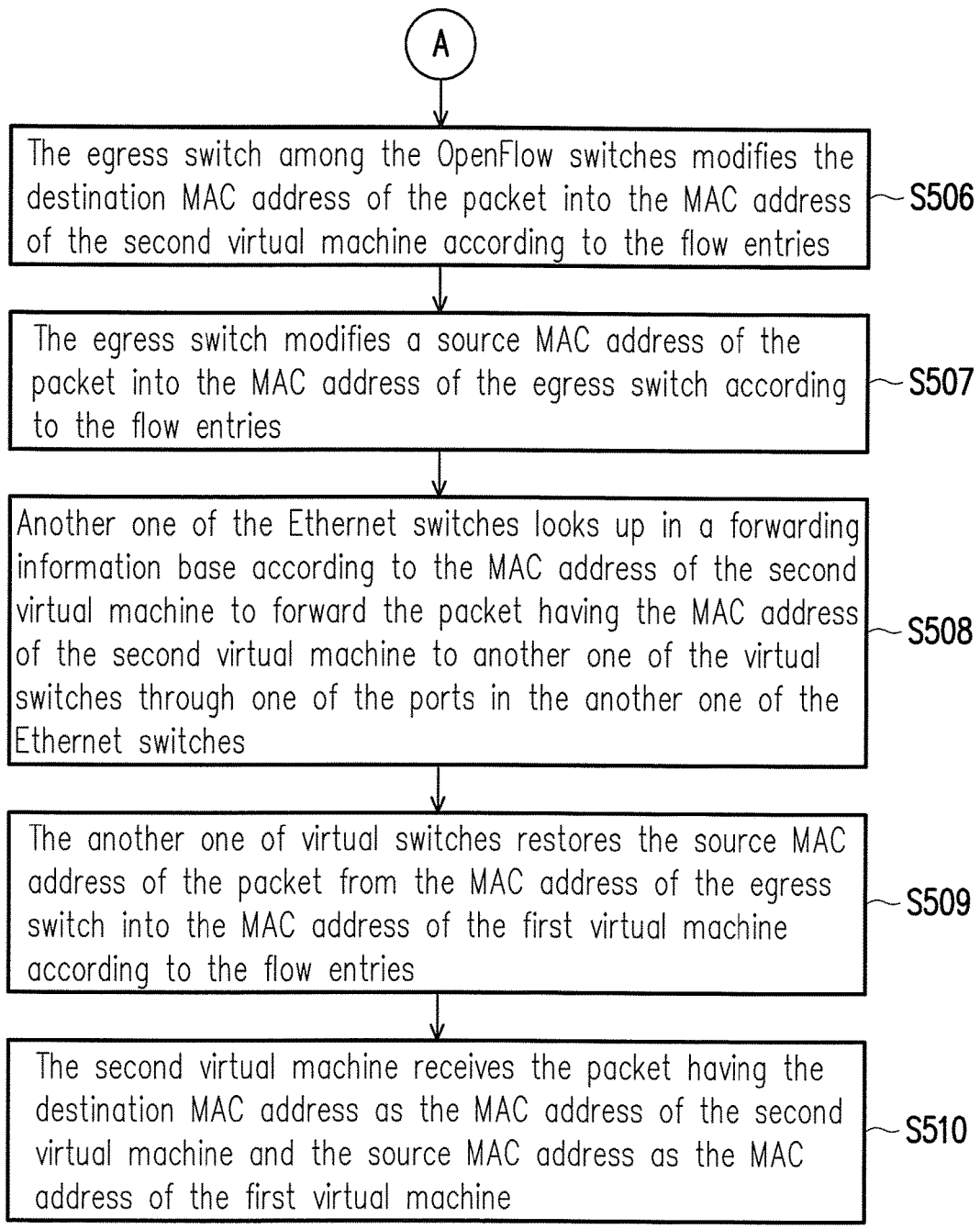

To describe the packet forwarding method of the data center network system of the disclosure in greater detail, another embodiment is provided in the following for description. FIG. 4 is a schematic view illustrating a packet forwarding method according to an embodiment of the disclosure. FIGS. 5A and 5B are flowcharts illustrating a packet forwarding method according to an embodiment of the disclosure. A data center network system shown in FIG. 4 is similar to the data center network system 20 shown in FIG. 2. Thus, respective connections and functions of the devices in the data center network system 20 may be referred to the description of FIG. 2, and are thus not repeated in the following. It should be noted in advance that, in the embodiment of FIG. 4, a header format of a packet is exemplified as in Table 1.

TABLE 1

| Destination MAC Address | Source MAC Address | Virtual Local Area Network (VLAN) tag | Destination Internet Protocol (IP) Address | Source IP Address |
|---|---|---|---|---|

Referring to FIGS. 4, and 5A together, at Step S501, the central control device 800 sets a plurality of flow entries in the virtual switches 502_1 and 502_2 in the physical machines 500_1 and 500_2 and the OpenFlow switches 700_2 and 700_3, so as to set up the routing path F1 between the virtual machines 501_1 and 501_2 for forwarding the packet. When the virtual machine 501_1 forwards the packet to the virtual machine 501_2 through the routing path F1, at Step 502, the virtual machine 501_1 generates the packet, sets the destination MAC address of the packet as the MAC address of the virtual machine 501_2, and sends the packet to the virtual switch 502_1 corresponding to the same physical machine 500_1. As shown in FIG. 4, in a packet header PH1 of the packet generated by the virtual machine 501_1, the destination MAC address of the packet is a MAC address VM2 of the virtual machine 501_2, and the source MAC address of the packet is a MAC address VM1 of the virtual machine 501_1.

At Step S503, the virtual switch 502_1 modifies the destination MAC address into the MAC address of the OpenFlow switch 700_3 according to the flow entries, and sends the packet to the Ethernet switch 600_1. As shown in a packet header PH2 in FIG. 4, the virtual switch 502_1 modifies the destination MAC address of the packet from the MAC address VM2 of the virtual machine 501_2 into a MAC address OFS3 of the OpenFlow switch 700_3, and forwards the packet having the MAC address OFS3 of the OpenFlow switch 700_3 to the Ethernet switch 600_1 connected to the virtual switch 502_1.

At Step S504, the Ethernet switch 600_1 looks up in a forwarding information base (FIB) T1 according to the MAC address OFS3 of the OpenFlow switch 700_3, so as to forward the packet having the MAC address OFS3 of the OpenFlow switch 700_3 to the ingress switch (i.e., the OpenFlow switch 700_3) through one of the ports of the Ethernet switch 600_1. More specifically, the forwarding information base T1 records a plurality of MAC addresses and a corresponding port number associated with each of the MAC addresses. In this way, by comparing the destination MAC address of the packet and the MAC addresses in the forwarding information base T1, the Ethernet switch 600_1 may decide which port the packet is to be forwarded to.

In this embodiment, the forwarding information base T1 of the Ethernet switch 600_1 records a port P1 with a port number "1" and the MAC address OFS3 corresponding to the port P1 and a port P2 with a port number "2" and a MAC address OFS5 corresponding to the port P2. Accordingly, when the Ethernet switch 600_1 receives the packet through the port P3, the Ethernet switch 600_1 may decide to forward the packet having the MAC address OFS3 of the OpenFlow switch 700_3 to the OpenFlow switch 700_3 through the port P1. Similarly, in another embodiment, based on the forwarding information base T1, when destination MAC address of the packet received by the Ethernet switch 600_1 is the MAC address OFS5 of the OpenFlow switch 700_5, the Ethernet switch 600_1 may forward the packet to the OpenFlow switch 700_5 connected to the port P2.

It should be noted that, with the virtual switch 502_1 modifying the destination MAC address of the packet, the Ethernet switch 600_1 does not know that the packet is to be forwarded to the virtual machine 501_2. Namely, with the virtual switch 502_1 modifying the destination MAC address of the packet, the forwarding information base of the Ethernet switch 600_1 does not need to learn or record forwarding information associated with the MAC address of the virtual machine 501_2. Thus, a volume of data that the forwarding information base T1 of the Ethernet switch 600_1 needs to record may be significantly reduced, thereby helping expansion of a large-scale database center.

Then, at Step S505, the ingress switch (i.e., the OpenFlow switch 700_3) modifies the destination MAC address of the packet into the MAC address of the egress switch (i.e., the OpenFlow switch 700_2) of the OpenFlow switches 700_1 to 700_5 according to the flow entries. Thus, the egress switch receives the packet. As shown in a packet header PH3 of FIG. 4, the OpenFlow switch 700_3 receives the packet through the port P1 of the OpenFlow switch 700_3, and the OpenFlow switch 700_3 modifies the destination MAC address of the packet from the MAC address OFS3 into the MAC address OFS2 of the OpenFlow switch 700_2. Then, the OpenFlow switch 700_3 forwards the packet to the OpenFlow switch 700_2 through the port P2 of the OpenFlow switch 700_3.

Referring to FIGS. 4 and 5B, at Step S506, the egress switch (i.e., the OpenFlow switch 700_2) of the OpenFlow switches 700_1 to 700_5 modifies the destination MAC address of the packet into the MAC address of the virtual machine 501_2 according to the flow entries. At S507, the egress switch (i.e., the OpenFlow switch 700_2) modifies a source MAC address of the packet into the MAC address OFS2 of the egress switch (i.e., the OpenFlow switch 700_2) according to the flow entries. As shown in a packet header PH4, the OpenFlow switch 700_2, the OpenFlow switch 700_2 modifies the destination MAC address of the packet from the MAC address OFS2 thereof into a MAC address VM2 of the virtual machine 501_2. Moreover, the OpenFlow switch 700_2 further modifies the source MAC address of the packet from the MAC address VM1 of the virtual machine 501_1 into the MAC address OFS2 thereof. Thereafter, the OpenFlow switch 700_2 forwards the packet having the MAC address VM2 of the virtual machine 501_2 and the MAC address OFS2 of the egress switch (i.e., the OpenFlow switch 700_2) to the corresponding Ethernet switch 600_2.

At Step S508, the Ethernet switch 600_2 looks up in a forwarding information base T2 according to the MAC address VM2 of the virtual machine 501_2 to forward the packet having the MAC address VM2 of the virtual machine 501_2 to the virtual switch 502_2 through the port P1 with the port number "1" of the Ethernet switch 600_2. It should be noted that the Ethernet switch 600_2 may associate the MAC address OFS2 of the egress switch (i.e., the OpenFlow switch 700_2) with the port P2 in response to receiving the packet having the MAC address OFS2 of the egress switch (i.e., the OpenFlow switch 700_2), so as to record a corresponding relation between the MAC address OFS2 of the egress switch and the port P2. As shown in the forwarding information base T2 in FIG. 4, the Ethernet switch 600_2 may associate the port P2 with the port number "2" with the MAC address OFS2 through learning, and record forwarding information between the MAC address OFS2 and the port P2 with the port number "2". More specifically, the OpenFlow switches 700_1 to 700_5 may execute a function of link layer discovery protocol (LLDP), so that the Ethernet network switch 600_2 may associate the MAC address OFS2 of the OpenFlow switch 700_2 with the port P2.

At Step S509, the virtual switch 502_2 corresponding to the virtual machine 501_2 restores the source MAC address of the packet from the MAC address OFS2 of the egress switch (i.e., the OpenFlow switch 700_2) into the MAC address VM1 of the virtual machine 501_1 according to the flow entries. As shown in a packet header PH5 in FIG. 4, the virtual switch 502_2 receives the packet having the MAC address VM2 of the virtual machine 501_2 from the Ethernet switch 600_2 connected to the virtual switch 502_2, and restores the source MAC address of the packet from the MAC address OFS2 of the OpenFlow switch 700_2 into the MAC address VM1 of the virtual machine 501_1. At Step S510, the virtual machine 501_2 receives the packet having the destination MAC address as the MAC address of the virtual machine 501_2 and the source MAC address as the MAC address of the virtual machine 501_1.

Based on the description of FIGS. 2, 3, 4, 5A, and 5B, it can be known that, even though the Ethernet switches in the aggregation layer network of the disclosure is unable to decide routing of the packet under the control of the central control device, a dynamic routing control ability of the data center network system of the disclosure is still equivalent to a network system completely constructed by using the OpenFlow switches.

It should also be noted that the central control device of this embodiment may designate the MAC addresses of the physical machines and the virtual machines in the data center network system according to tenant-related information. Compared with the conventional method of using a virtual local area network tag to distinguish the tenants, setting a MAC frame in this embodiment is compatible with a data center network framework at a larger scale.

More specifically, the database of the data center network system stores the management information associated with the virtual machines and the physical machines, such as a tenant ID of at least one of tenant, the PM IDs of the physical machines, the VM IDs of the virtual machines, the IP addresses of the physical machines and the virtual machines, and a quality of service (QoS) level information related to the tenants or the virtual machines, etc. Accordingly, taking the data center network system of FIG. 1 as an example, the central control device 400 of the data center network system 10 may allocate the MAC addresses of the physical machines 100_1 to 100_Q and the virtual machines (e.g., the virtual machine 102) according to the PM IDs of the physical machines 100_1 to 100_Q, the VM IDs of the virtual machines (e.g., the virtual machine 102), and the tenant IDs of the tenants. Besides, the central control device 400 may further assign the MAC addresses of the physical machines 100_1 to 100_Q and the virtual machine (e.g., the virtual machine 102) according to the QoS level information related to the tenants and the virtual machines.

Figure 6:
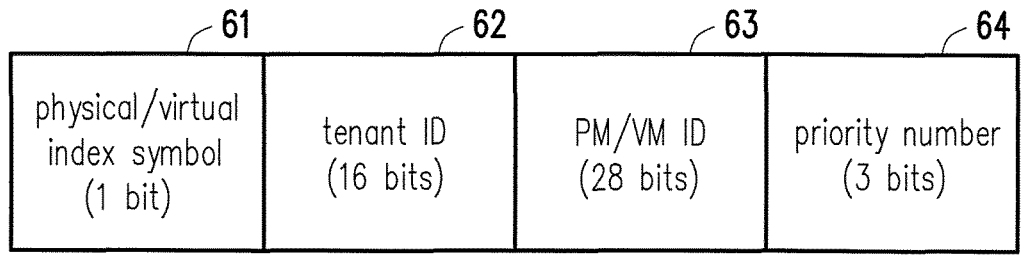
FIG. 6 is a schematic view illustrating a MAC frame according to an embodiment of the disclosure.

FIG. 6 is a schematic view illustrating a media access control frame (MAC frame) according to an embodiment of the disclosure. In this embodiment, MAC frames of the physical machines and the virtual machines may include a plurality of fields recording a physical/virtual index symbol, the tenant ID, the PM ID/VM ID, and a priority number related to the QoS level. Here, the physical/virtual index symbol indicates whether an address in the MAC frame is the MAC address of a physical machine or a virtual machine. As shown in FIG. 6, a MAC frame 60 may include a field 61 for recording the physical/virtual index symbol, a field 62 for recording the tenant ID, a field 63 for recording the PM ID/VM ID, and a field 64 for recording the priority number of the QoS level. A length of the field 61 is 1 bit, a length of the field 62 is 16 bits, a length of the field 63 is 28 bits, and a length of the field 64 is 3 bits. However, the example in FIG. 6 is only provided for an illustrative purpose, instead of limiting the disclosure. The disclosure does not intend to impose a limitation on how the fields 61 to 64 are arranged and the lengths of the fields 61 to 64. Besides, in another embodiment, the MAC frame may further include fields for recording other information, and the disclosure does not intend to impose a limitation in this regard. For example, in addition to the fields 61 to 64, the MAC frames of the physical machines and the virtual machines may further include a reserved field.

Figure 7:
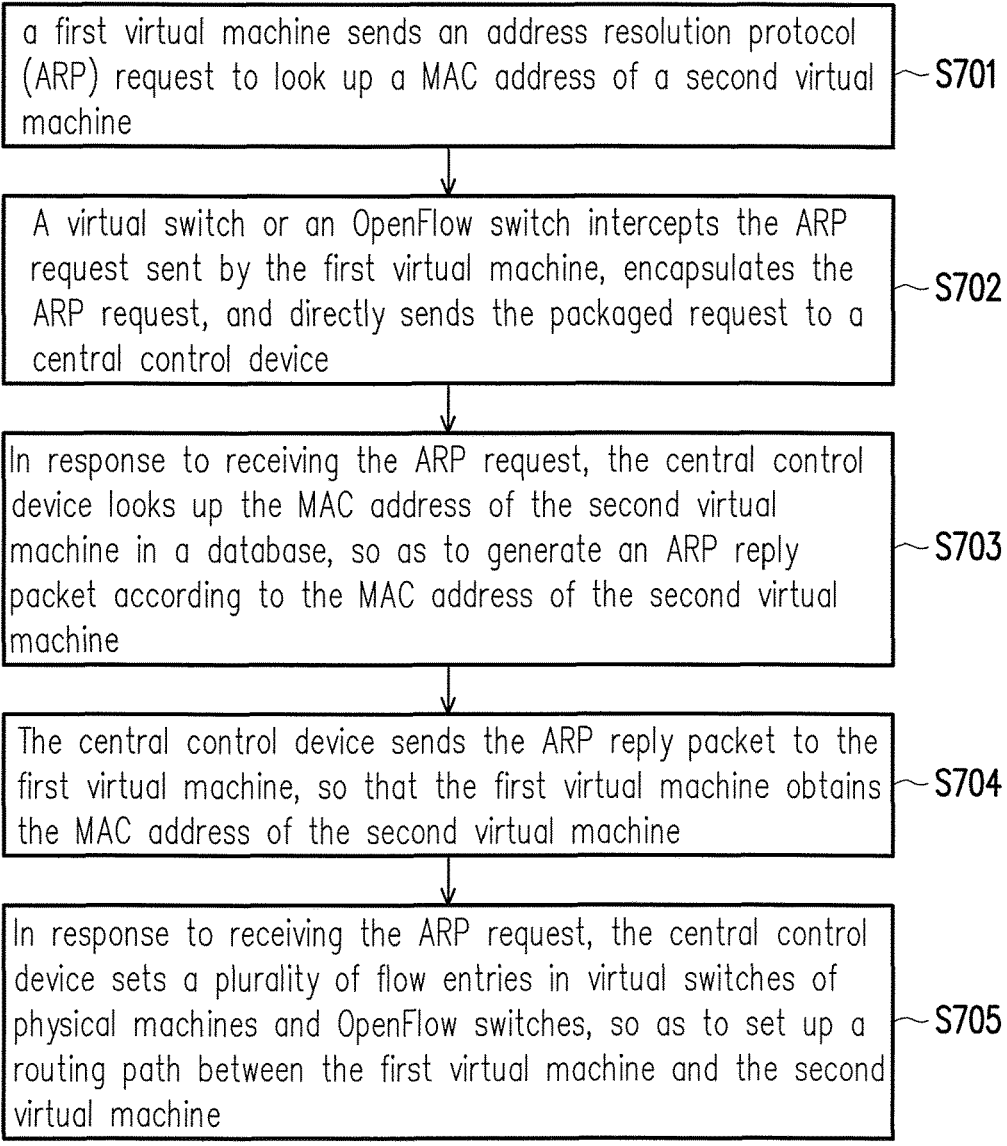
FIG. 7 is flowchart illustrating an address resolution method according to an embodiment of the disclosure.

Based on the data center network system of the disclosure including the Ethernet switches and the OpenFlow switches, FIG. 7 is flowchart illustrating an address resolution method according to an embodiment of the disclosure. Referring to FIG. 7, at Step S701, a first virtual machine among the virtual machines sends an address resolution protocol (ARP) request to look up a MAC address of a second virtual machine among the virtual machines. At Step S702, the virtual switch or the OpenFlow switch intercepts the ARP request sent by the first virtual machine, encapsulates the ARP request, and directly sends the encapsulated ARP request to the central control device. The virtual switch or the switch may use a Packet-In message in the OpenFlow protocol to encapsulate the intercepted ARP request and directly send the encapsulated request to the central control device.

At Step S703, in response to receiving the ARP request, the central control device looks up the MAC address of the second virtual machine in a database, so as to generate an ARP reply packet according to the MAC address of the second virtual machine. At Step S704, the central control device sends the ARP reply packet to the first virtual machine, so that the first virtual machine obtains the MAC address of the second virtual machine. At Step S705, in response to receiving the ARP request, the central control device sets a plurality of flow entries in the virtual switches in the physical machines and the OpenFlow switches, so as to set up a routing path between the first virtual machine and the second virtual machine.

Figure 8:
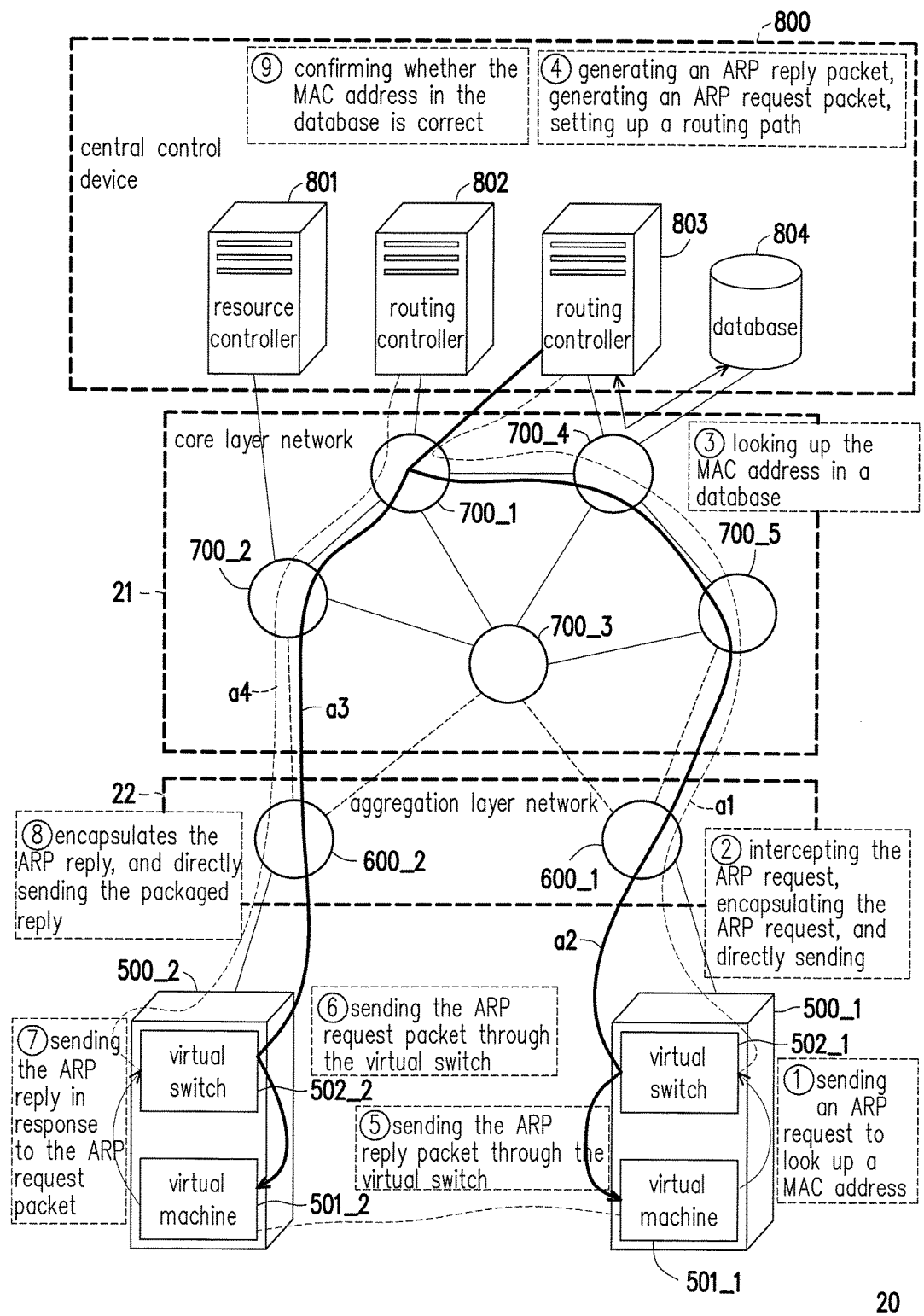
FIG. 8 is a schematic view illustrating an address resolution method according to an embodiment of the disclosure.

Besides, when the central control device receives the ARP request, the central control device may send an ARP request packet to the second virtual machine in addition to generating the ARP reply packet to reply to the first virtual machine. Accordingly, the second virtual machine also sends an ARP reply in response to receiving the ARP request packet. The virtual switch or the OpenFlow switch may intercept the ARP reply, encapsulate the ARP reply into an encapsulated ARP reply packet by using the Packet-In message, and directly send the encapsulated ARP reply packet to the central control device. In this way, the central control device may confirm whether the MAC address of the second virtual machine in the database is correct according to the ARP reply of the second virtual machine. To describe the address resolution method of the disclosure in greater detail, FIG. 8 is a schematic view illustrating an address resolution method according to an embodiment of the disclosure. A data center network system shown in FIG. 8 is similar to the data center network system 20 shown in FIG. 2. Thus, respective connections and functions of the devices in the data center network system 20 may be referred to the description of FIG. 2, and are thus not repeated in the following.

Referring to FIG. 8, at Step 1, the virtual machine 501_1 sends the ARP request to look up the MAC address of the virtual machine 501_2. At Step 2, the virtual switch 502_1 corresponding to the virtual machine 501_1 intercepts the ARP request sent by the virtual machine 501_1, encapsulates the ARP request, and directly sends the encapsulated ARP request to the routing controller 803 through the path a1. In this embodiment, the virtual switch 502_1 encapsulates the ARP request by using the Packet-In message and directly sends the encapsulated ARP request to the routing controller 803. In this way, the Ethernet switch 600_1 may be not aware that the virtual machine 501_1 sends the ARP request. Accordingly, the address resolution method of the disclosure is able to prevent the Ethernet switch in the data center network system from frequently broadcasting the ARP request.

At Step 3, in response to receiving the ARP request, the routing controller 803 looks up the MAC address of the virtual machine 501_2 in the database 804. At Step 4, the routing controller 803 generates the ARP reply packet according to the MAC address of the virtual machine 501_2, generates the ARP request packet in response to receiving the ARP request from the virtual machine 501_1, and sets up the routing path between the virtual machine 501_1 and the second virtual machine 501_2.

Then, at Step 5, the routing controller 803 sends the ARP reply packet to the virtual machine 501_1 through the virtual switch 502_1 via a path a2. In this embodiment, the routing controller 803 may encapsulate the ARP reply packet by using a Packet-Out message and directly sends the encapsulated ARP reply packet to the virtual switch 502_1, so that the Ethernet switch 600_1 may be not aware that the ARP reply packet contains the MAC address of the virtual machine 501_2, and does not record any forwarding information associated with the MAC address of the virtual machine 501_2 in the forwarding information base. At Step 6, the routing controller 803 sends the ARP request packet to the virtual machine 501_2 through a path a3. At Step 7, the virtual machine 501_2 sends the ARP reply in response to receiving the ARP request packet.

At Step 8, the virtual switch 502_2 corresponding to the virtual machine 501_2 intercepts the ARP reply, encapsulates the ARP reply, and directly sends the encapsulated ARP reply to the routing controller 802 through a path a4. In this embodiment, the virtual switch 502_2 intercepts the ARP reply, encapsulates the ARP reply by using the Packet-In message, and directly sends the encapsulated ARP reply packet to the routing controller 802. Step 9, in response to receiving the ARP reply, the routing controller 802 confirms whether the MAC address of the virtual machine 501_2 in the database 804 is correct.

It should be noted that, based on the encapsulation forwarding method of the disclosure, it can be known that, in an embodiment, the Ethernet switch may forward the packet in the condition that the forwarding information base of the Ethernet switch merely records the MAC addresses of the virtual machines, virtual switches and OpenFlow switches that are directly connected to the Ethernet switch itself. Accordingly, based on the address resolution method of the disclosure, the Ethernet switch may be prevented from recording unnecessary MAC addresses in the forwarding information base in response to receiving the ARP request or ARP reply, thus helping expand the scale of the data center network system.

Figure 9:
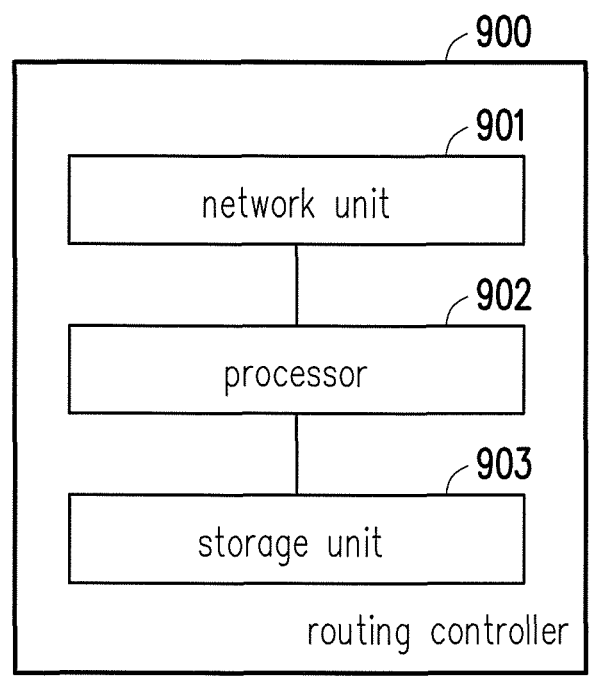
FIG. 9 is a schematic view illustrating a routing controller according to an embodiment of the disclosure.

FIG. 9 is a schematic view illustrating a routing controller according to an embodiment of the disclosure. Referring to FIG. 9, a routing controller 900 is in charge of managing and controlling a software-defined network (SDN) based on the OpenFlow protocol, such as the routing controllers 402 and 403 shown in FIG. 1 or the routing controllers 802 and 803 shown in FIG. 2. The routing controller 900 includes a network unit 901, a processor 902, and a storage unit 903.

The network unit 901 is connected to the core layer network (e.g., the core layer network 11 shown in FIG. 1 or the core layer network 21 shown in FIG. 2), such as a network interface card or a wireless communication chip, and is coupled to the processor 902. The processor 902 controls all the operations of the routing controller 900, and may be a control circuit of any type, such as a system-on-chip (SOC), an application processor, a media processor, a media processor, a microprocessor, a central processing unit (CPU), a digital signal processor, or other similar components. However, the disclosure is not limited thereto.

The storage unit 903 may be any fixed or removable random access memory (RAM), read-only memory (ROM), flash memory, hard drive, other similar devices, or a combination of the aforesaid devices, for example. However, the disclosure is not limited thereto. The storage unit 903 is coupled to the processor 802 and stores a plurality of commands. The processor 902 executes the commands to manage the core layer network of the data center network system and control the OpenFlow switches and the virtual switches to execute the corresponding operations according to the flow entries.

In this embodiment, the processor 902 decides the routing path for forwarding the packet between the first virtual machine among the virtual machines and the second virtual machine among the virtual machines. The processor 902 sends commands to the virtual switches on the routing path to control the one of the virtual switches to write a first flow entry to the flow table of the one of the virtual switch. An operation of the first flow entry includes modifying the destination MAC address of the packet into the MAC address of one of the OpenFlow switches. The processor 902 sends commands to another one of the OpenFlow switches on the routing path to control the another one of OpenFlow switches to write a second flow entry to the flow table of the another one of the OpenFlow switches. An operation of the second flow entry includes modifying the destination MAC address of the packet into the MAC address of the second virtual machine, and modifying the source MAC address of the packet into the MAC address of the another one of the OpenFlow switches.

The processor 902 sends commands to the virtual switches on the routing path to control another one of the virtual switches to write a third flow entry to the flow table of the another one of the virtual switches. An operation of the third flow entry includes restoring the source MAC address of the packet from the MAC address of the another one of the OpenFlow switches to the MAC address of the first virtual machine. The processor 902 sends commands to the ingress switch among the OpenFlow switches on the routing path to control the ingress switch to write a fourth flow entry to the flow table of the ingress switch. An operation of the fourth flow entry includes modifying the destination MAC address of the packet into the MAC address of the egress switch among the OpenFlow switches. The processor 902 sends commands to the egress switch on the routing path to control the egress switch to write the fifth flow entry to the flow table of the egress switch. An operation of the fifth flow entry includes modifying the destination MAC address of the packet into the MAC address of the second virtual machine, and modifying the source MAC address of the packet into the MAC address of the egress switch.

In response to receiving the ARP request, the processor 902 look up the MAC address of the second virtual machine in the database, so as to generate the ARP reply packet according to the MAC address of the second virtual machine. The processor 902 encapsulates the ARP reply packet by using the Packet-Out message and sends the ARP reply packet to the first virtual machine through a virtual switch corresponding to the first virtual machine. Furthermore, in response to receiving the ARP request, the processor 902 generates and encapsulates the ARP request packet by using the Packet-Out message and sends the encapsulated ARP request packet to the second virtual machine through a virtual switch corresponding to the second virtual machine, so that the second virtual machine sends the ARP reply in response to receiving the encapsulated ARP request packet. In response to receiving the ARP reply packet associated with the ARP reply generated by the second virtual machine, the processor 902 confirms whether the MAC address of the second virtual machine in the database is correct.

In view of the foregoing, the disclosure combines the Ethernet switches and the OpenFlow switches to deploy an efficient network system and meet the requirements of a large-scale data center. Since the network system of the large-scale data center may be established by using the Ethernet switches, the cost may be reduced significantly. Besides, based on the packet forwarding method of the disclosure, the scale of the large-scale data center is not limited by the size of the forwarding information base (FIB) of the Ethernet switches. By setting the MAC frame in the disclosure, the number of tenants permitted may increase significantly. The data center network system of the disclosure may change the amount and connection of the Ethernet switches and OpenFlow switches any time without additional settings. In particular, even in a network environment having the Ethernet switches, dynamic routing in the data center network system of the disclosure may still be controlled and managed by the central control device compatible with the OpenFlow protocol.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A data center network system based on a software-defined network, comprising:
    a plurality of virtual switches, a plurality of virtual machines, and a plurality of physical machines, wherein each of the physical machines comprises one of the virtual switches and at least one of the virtual machines, and the one of the virtual switches corresponds to the at least one of the virtual machines which is in the same physical machine;
    a plurality of Ethernet switches, connected to the physical machines;
    a plurality of OpenFlow switches connected to each other, wherein a part or all the OpenFlow switches are connected to the Ethernet switches, wherein a core layer network comprises the OpenFlow switches, and the physical machines are connected to the core layer network through an aggregation layer network comprising the Ethernet switches; and
    a central control device, connected to the OpenFlow switches, and setting up a plurality of flow entries in the virtual switches of the physical machines and the OpenFlow switches, to set up a routing path for forwarding a packet between the virtual machines,
    wherein one of the virtual switches modifies a destination media access control (MAC) address of the packet into a MAC address of an ingress switch among the OpenFlow switches according to the flow entries, such that one of the Ethernet switches forwards the packet modified by and received from the one of the virtual switches to the ingress switch of the core layer network by looking up in a forwarding information base (FIB) according to the MAC address of the ingress switch, and
    wherein an egress switch among the OpenFlow switches of the core layer network modifies the destination MAC address of the packet into a MAC address of one of the virtual machines according to the flow entries, such that another one of the Ethernet switches forwards the packet modified by and received from the egress switch of the core layer network to the corresponding virtual switch according to the MAC address of the one of the virtual machines.

2. The data center network system as claimed in claim 1, wherein
    a first virtual machine among the virtual machines forwards the packet to a second virtual machine among the virtual machines through the routing path,
    wherein the first virtual machine generates the packet, sets the destination MAC address of the packet as a MAC address of the second virtual machine, and forwards the packet to the virtual switch corresponding to the same physical machine.

3. The data center network system as claimed in claim 2, wherein the first virtual machine and a first virtual switch among the virtual switches correspond to a first physical machine among the physical machines, and the second virtual machine and a second virtual switch among the virtual switches correspond to a second physical machine among the physical machines,
    wherein the first virtual switch modifies the destination MAC address of the packet from the MAC address of the second virtual machine into the MAC address of the one of the OpenFlow switches, and forwards the packet having the MAC address of the one of the OpenFlow switches to the one of the Ethernet switches connected to the first virtual switch.

4. The data center network system as claimed in claim 3, wherein the second virtual switch receives the packet having the MAC address of the second virtual machine from the another one of Ethernet switch connected to the second virtual switch, and restores a source MAC address of the packet from the MAC address of the another one of OpenFlow switches to a MAC address of the first virtual machine.

5. The data center network system as claimed in claim 1, wherein the ingress switch among the OpenFlow switches modifies the destination MAC address of the packet into a MAC address of the egress switch among the OpenFlow switches, such that the egress switch receives the packet,
    wherein the egress switch modifies a source MAC address of the packet into the MAC address of the egress switch, and forwards the packet having the MAC address of the one of the virtual machines and the MAC address of the egress switch to the corresponding Ethernet switch.

6. The data center network system as claimed in claim 5, wherein the one of the Ethernet switches looks up in the forwarding information base (FIB) according to the MAC address of the ingress switch, so as to forward the packet to the ingress switch among the OpenFlow switches through one of a plurality of ports of the one of the Ethernet switches.

7. The data center network system as claimed in claim 5, wherein in response to receiving the packet having the MAC address of the egress switch, the another one of the Ethernet switches associates the MAC address of the egress switch with one of a plurality of ports, so as to record a corresponding relation between the MAC address of the egress switch and the one of the ports in a forwarding information base.

8. The data center network system as claimed in claim 1, wherein the central control device allocates MAC addresses of the physical machines and the virtual machines according to physical machine identities (PM IDs) of the physical machines, virtual machine identities (VM IDs) of the virtual machines, and a tenant identity (tenant ID) of at least one tenant, and MAC frames of the physical machines and the virtual machines comprise a plurality of fields configured to record a physical/virtual index symbol, the tenant ID, and the VM/PM IDs.

9. The data center network system as claimed in claim 8, wherein the central control device further assigns the MAC addresses of the physical machines and the virtual machines according to a quality of service (QoS) level associated with the tenant and the virtual machines, and the MAC frames of the physical machines and the virtual machines further comprise another field configured to record a priority number associated with the QoS level.

10. The data center network system as claimed in claim 1, wherein a first virtual machine among the virtual machines sends an address resolution protocol (ARP) request to look up a MAC address of a second virtual machine among the virtual machines, the virtual switch corresponding to the first virtual machine intercepts the ARP request sent by the first virtual machine, encapsulates the ARP request according to an OpenFlow protocol message, and directly sends the encapsulated ARP request to the central control device.

11. The data center network system as claimed in claim 10, wherein in response to receiving the ARP request, the central control device looks up the MAC address of the second virtual machine in a database, and generates and encapsulates an ARP reply packet according to the MAC address of the second virtual machine by using an Packet-Out message,
wherein the central control device sends the encapsulated ARP reply packet to the first virtual machine through the virtual switch corresponding to the first virtual machine.

12. The data center network system as claimed in claim 11, wherein in response to receiving the ARP request, the central control device encapsulates and sends an ARP request packet to the second virtual machine, and the second virtual machine sends an ARP reply in response to receiving the encapsulated ARP request packet,
wherein the virtual switch corresponding to the second virtual machine intercepts the ARP reply, encapsulates the ARP reply according to the OpenFlow protocol message, and sends the encapsulated ARP reply to the central control device, such that the central control device confirms whether the MAC address of the second virtual machine in the database is correct in response to receiving the ARP reply.

13. A packet forwarding method, for a data center network system based on a software-defined network, the method comprising:
setting, by a central control device, a plurality of flow entries in a plurality of virtual switches of a plurality of physical machines and a plurality of OpenFlow switches, so as to set up a routing path for forwarding a packet between a plurality of virtual machines;
modifying, by one of the virtual switches, a destination media access control (MAC) address of the packet into a MAC address of an ingress switch among the OpenFlow switches according to the flow entries, such that one of the Ethernet switches forwards the packet modified by and received from the one of the virtual switch to the ingress switch of a core layer network by looking up in a forwarding information base (FIB) according to the MAC address of the ingress switch; and
modifying, by an egress switch among the OpenFlow switches of the core layer network, the destination MAC address of the packet into a MAC address of one of the virtual machines according to the flow entries, such that another one the Ethernet switches forwards the packet modified by and received from the egress switch of the core layer network to the corresponding virtual switch according to the MAC address of the one of the virtual machines,
wherein the data center network system comprises the physical machines, the Ethernet switches connected to the physical machines, the OpenFlow switches connected to each other and to the Ethernet switches, and the central control device connected to the OpenFlow switches, and the physical machines respectively comprise one of the virtual switches and at least one of the virtual machines,
wherein the core layer network comprises the OpenFlow switches, and the physical machines are connected to the core layer network through an aggregation layer network comprising the Ethernet switches.

14. The packet forwarding method as claimed in claim 13, further comprising:
modifying, by the egress switch, a source MAC address of the packet into a MAC address of the egress switch.

15. The packet forwarding method as claimed in claim 13, further comprising:
modifying, by the ingress switch, the destination MAC address of the packet into a MAC address of the egress switch among the OpenFlow switches according to the flow entries, such that the egress switch receives the packet.

16. The packet forwarding method as claimed in claim 13, wherein a first virtual machine among the virtual machines forwards the packet to a second virtual machine among the virtual machines through the routing path, and the method further comprises:
restoring, by the virtual switch corresponding to the second virtual machine, a source MAC address of the packet from a MAC address of the egress switch to a MAC address of the first virtual machine according to the flow entries.

17. The packet forwarding method as claimed in claim 13, wherein the step that the one of the Ethernet switches forwards the packet modified by and received from the one of the virtual switches to the ingress switch of the core layer network by looking up in the forwarding information base according to the MAC address of the ingress switch comprises:

looking up, by the one of the Ethernet switches, in the forwarding information base (FIB) according to the MAC address of the ingress switch, so as to forward the packet having the MAC address of ingress switch to the ingress switch through one of a plurality of ports of the one of the Ethernet switches.

18. The packet forwarding method as claimed in claim 13, wherein a first virtual machine among the virtual machines forwards the packet to a second virtual machine among the virtual machines through the routing path, and the method further comprises:

generating, by the first virtual machine, the packet, setting, by the first virtual machine, the destination MAC address of the packet as a MAC address of the second virtual machine, and forwarding, by the first virtual machine, the packet to the virtual switch corresponding to the same physical machine.

19. The packet forwarding method as claimed in claim 13, wherein MAC frames of the physical machines and the virtual machines comprise a plurality of fields configured to record a physical/virtual index symbol, a tenant identity (tenant ID), and a physical machine/virtual machine identity (PM/VM ID).

20. An address resolution method, for a data center network system based on a software-defined network, wherein the data center network system comprises a plurality of physical machines, a plurality of Ethernet switches connected to the physical machines, a plurality of OpenFlow switches connected to each other and to the Ethernet switches, and a central control device connected to the OpenFlow switches, and the physical machines respectively comprise a virtual switch and at least one virtual machine, the method comprising:

sending, by a first virtual machine among the virtual machines, an address resolution protocol (ARP) request to look up a MAC address of a second virtual machine among the virtual machines;

intercepting, by one of the virtual switches or one of the OpenFlow switches, the ARP request sent by the first virtual machine, encapsulating, by one of the virtual switches or one of the OpenFlow switches, the ARP request, and directly sending, by one of the virtual switches or one of the OpenFlow switches, the encapsulated ARP request to the central control device;

in response to receiving the ARP request, looking up, by the central control device, the MAC address of the second virtual machine in a database, so as to generate and encapsulate an ARP reply packet according to the MAC address of the second virtual machine; and sending, by the central control device, the encapsulated ARP reply packet to the first virtual machine through the virtual switch corresponding to the first virtual machine, such that the first virtual machine obtains the MAC address of the second virtual machine, wherein the address resolution method further comprises:

in response to receiving the ARP request, encapsulating and sending, by the central control device, an ARP request packet to the second virtual machine by using a Packet-Out message;

in response to receiving the encapsulated ARP request packet, sending, by the second virtual machine, an ARP reply; and intercepting, by another one of the virtual switches or another one of the OpenFlow switches, the ARP reply, encapsulating, by the another one of the virtual switches or the another one of the OpenFlow switches, the ARP reply with a Packet-In message, and directly sending, by the another one of the virtual switches or the another one of the OpenFlow switches, the encapsulated ARP reply to the central control device.

21. The address resolution method as claimed in claim 20, wherein the method further comprises:

in response to receiving the ARP request, setting, by the central control device, a plurality of flow entries in the virtual switches of the physical machines and the OpenFlow switches, so as to set up a routing path between the first virtual machine and the second virtual machine.

22. The address resolution method as claimed in claim 20, wherein the one of the virtual switches or the one of the OpenFlow switches encapsulates the ARP request by using the Packet-In message in an OpenFlow protocol message and directly sends the encapsulated ARP request to the central control device.

23. The address resolution method as claimed in claim 20, further comprising:

in response to receiving the ARP reply, confirming, by the central control device, whether the MAC address of the second virtual machine in the database is correct.

24. The address resolution method as claimed in claim 20, wherein MAC frames of the physical machines and the virtual machines comprise a plurality of fields configured to record a physical/virtual index symbol, a tenant identity (tenant ID), and a physical machine/virtual machine identity (PM/VM ID).

25. A routing controller for a data center network system based on a software-defined network, and the routing controller comprises:

a network unit, connected to a core layer network, wherein the core layer network comprises a plurality of OpenFlow switches connected to each other and to a aggregation layer network;

a processor, coupled to the network unit; and a storage unit, coupled to the processor and storing a plurality of commands, wherein the processor executes the commands to:

decide a routing path for forwarding a packet between a first virtual machine among a plurality of virtual machines and a second virtual machine among the virtual machines;

send commands to a plurality of virtual switches on the routing path, so as to control one of the virtual switches to write a first flow entry to a flow table of the one of the virtual switches, wherein an operation of the first flow entry comprises: modifying a destination MAC address of the packet into a MAC address of one of the OpenFlow switches; and send commands to the OpenFlow switches on the routing path, so as to control one of the OpenFlow switches to write a second flow entry to a flow table of the one of the OpenFlow switches, wherein an operation of the second flow entry comprises: modifying the destination MAC address of the packet into a MAC address of the second virtual machine, wherein the data center network system comprises the physical machines connected to the aggregation layer network, the aggregation layer network comprises a plurality of Ethernet switches, the physical machines respectively comprise at least one of the virtual machines and one of the virtual switches.

26. The routing controller as claimed in claim 25, wherein the processor executes the commands to:
send commands to the virtual switch on the routing path, so as to control another one of the virtual switches to write a third flow entry to the flow table of the another one of virtual switch, wherein an operation of the third flow entry comprises: restoring a source MAC address of the packet from the MAC address of another one of the OpenFlow switches to the MAC address of the first virtual machine.

27. The routing controller as claimed in claim 25, wherein the processor executes the commands to:
send commands to an ingress switch among the Open-Flow switches on the routing path, so as to control the ingress switch to write a fourth flow entry to a flow table of the ingress switch, wherein an operation of the fourth flow entry comprises: modifying the destination MAC address of the packet into a MAC address of an egress switch among the OpenFlow switches; and
send commands to the egress switch on the routing path, so as to control the egress switch to write a fifth flow entry to a flow table of the egress switch, wherein an operation of the fifth flow entry comprises: modifying the destination MAC address of the packet into the MAC address of the second virtual machine, and modifying a source MAC address of the packet into the MAC address of the egress switch.

28. The routing controller as claimed in claim 25, wherein when the first virtual machine sends an address resolution protocol (ARP) request to look up the MAC address of the second virtual machine, the processor executes the commands to:
in response to receiving the ARP request, look up the MAC address of the second virtual machine in a database, so as to encapsulate and generate an ARP reply packet according to the MAC address of the second virtual machine by using a Packet-Out message; and
send the encapsulated ARP reply packet to a first virtual switch corresponding to the first virtual machine through a virtual switch corresponding to the first virtual machine, such that the first virtual switch forwards the ARP reply packet to the first virtual machine.

29. The routing controller as claimed in claim 28, wherein the processor executes the commands to:
in response to receiving the ARP request, encapsulate and generate an ARP request packet by using the Packet-Out message, and send the encapsulated ARP request packet to a second virtual switch corresponding to the second virtual machine, such that the second virtual machine receives the ARP request packet and sends an ARP reply in response to receiving the ARP request packet; and
in response to receiving an ARP reply packet associated with the ARP reply, confirm whether the MAC address of the second virtual machine in the database is correct.

* * * * *